United States Patent
Gouyon et al.

(10) Patent No.: US 10,068,556 B2
(45) Date of Patent: Sep. 4, 2018

(54) PROCEDURALLY GENERATING BACKGROUND MUSIC FOR SPONSORED AUDIO

(71) Applicant: Pandora Media, Inc., Oakland, CA (US)

(72) Inventors: Fabien Gouyon, Berkeley, CA (US); Gordon Parker Rios, San Francisco, CA (US)

(73) Assignee: Pandora Media, Inc., Oakland, CA (US)

( * ) Notice: Subject to any disclaimer, the term of this patent is extended or adjusted under 35 U.S.C. 154(b) by 269 days.

(21) Appl. No.: 14/945,252

(22) Filed: Nov. 18, 2015

(65) Prior Publication Data

US 2017/0140743 A1     May 18, 2017

(51) Int. Cl.
*G10H 1/36* (2006.01)
*G10H 1/00* (2006.01)
*G06Q 30/02* (2012.01)
*G06F 17/30* (2006.01)

(52) U.S. Cl.
CPC ..... *G10H 1/0025* (2013.01); *G06F 17/30772* (2013.01); *G06Q 30/0255* (2013.01); *G10H 2210/021* (2013.01); *G10H 2210/111* (2013.01); *G10H 2210/145* (2013.01)

(58) Field of Classification Search
CPC ........... G10H 1/0025; G10H 2210/111; G10H 2210/145; G10H 2210/021; G06F 17/30772; G06Q 30/0255
USPC .......................................................... 84/610
See application file for complete search history.

(56) References Cited

U.S. PATENT DOCUMENTS

| 7,895,076 | B2* | 2/2011 | Kutaragi | G06Q 30/02 705/14.4 |
| 2001/0027412 | A1* | 10/2001 | Son | G06Q 30/02 705/14.53 |
| 2001/0037721 | A1* | 11/2001 | Hasegawa | G10H 1/0041 84/609 |

(Continued)

OTHER PUBLICATIONS

PCT International Search Report and Written Opinion for PCT/US2016/061916, dated Jan. 20, 2017, 10 Pages.

(Continued)

*Primary Examiner* — Jeffrey Donels
(74) *Attorney, Agent, or Firm* — Fenwick & West LLP

(57) ABSTRACT

A content server generates sponsored audio including procedurally generated background music. The content server obtains reference music features describing musicological characteristics of reference songs as well as sponsored audio information received from a third-party. The content server determines music generation parameters based on the sponsored audio information and based on a music model mapping the reference music features to music generation parameters. The music model may incorporate machine learning techniques to improve the mapping. The content server generates background music by using the determined music generation parameters as input to a procedural music algorithm, and generates sponsored audio by combining the generated background music concurrently with an audio voiceover obtained from the sponsored audio information. The sponsored audio is provided to a client device, which presents the sponsored audio to a user.

20 Claims, 7 Drawing Sheets

(56) References Cited

U.S. PATENT DOCUMENTS

| | | | | |
|---|---|---|---|---|
| 2001/0056573 | A1* | 12/2001 | Kovac | G06Q 30/02 725/32 |
| 2006/0206478 | A1 | 9/2006 | Glaser et al. | |
| 2008/0046917 | A1 | 2/2008 | de Heer | |
| 2010/0198982 | A1* | 8/2010 | Fernandez | G06Q 30/02 709/231 |
| 2012/0041954 | A1 | 2/2012 | Curtis et al. | |
| 2012/0158504 | A1* | 6/2012 | Kumar | G06Q 30/0255 705/14.53 |
| 2014/0122258 | A1 | 5/2014 | Sharp | |
| 2015/0319479 | A1 | 11/2015 | Mishra et al. | |
| 2016/0267552 | A1* | 9/2016 | Chandra | G06Q 30/0276 |
| 2016/0379274 | A1* | 12/2016 | Irwin | G06Q 30/0271 705/14.67 |

OTHER PUBLICATIONS

Bernardes, G., et al., "Beyond Music Information Retrieval: A Proposed Model for Automatic Generation of Dialogic Music," Beyond Music Information Retrieval: A Proposed Model for Automatic Generation of Dialogic Music, 2014, pp. 123-134, can be retrieved at <URL:http://telecom.inescporto.pt/~mdavies/pdfs/BernardesDavies14-nmc.pdf>.

Bernardes, G., et al., "Composing Music by Selection Content-based Algorithmic-Assisted Audio Composition," A dissertation submitted in partial fulfillment of the requirements for the degree of Doctor of Philosophy in Digital Media—Audiovisual and Interactive Content Creation, Jul. 2014, 231 Pages, can be retrieved at <URL:https://docs.google.com/file/d/OB6udPcaWBtlrU3VIVHQ2MDInUHc/edit?pli=1>.

Bernardes, G., et al., "Conchord: An Application for Generating Musical Harmony by Navigating in a Perceptually Motivated Tonal Interval Space," Sound and Music Computer, Inesc Tec, 2015, 16 paes, can be retrieved at <URL:http://telecom.inescporto.pt/~mdavies/pdfs/BernardesEtAl15-cmmr.pdf>.

Dias, R., et al., "A computer-mediated Interface for Jazz Piano Comping," Proceedings ICMC14 SMC14, Sep. 14-20, 2014, pp. 558-564, can be retrieved at <URL:http://www.icmc14-smc14.net/images/proceedings/PS4-B04-Acomputer-mediatedInterface.pdf>.

Dias, R., et al., "GimmeDaBlues: An Intelligent Jazz/Blues Player and Comping Generator for iOS devices," Inesc-Porto, 2012, 9 pages, can be retrieved at <URL:http://www.cmmr2012.eecs.qmul.ac.uk/sites/cmmr2012.eecs.qmul.ac.uk/files/pdf/papers/cmmr2012_submission_85.pdf>.

SMC Group, "GimmeDaBlues," 4 pages, [online] [Retrieved on Jul. 10, 2015] Retrieved from the internet <URL:http://smc.inescporto.pt/technologies/gimme-da-blues/>.

Wikipedia, "David Cope," Last Modified on Jun. 2, 2015, 5 pages [online] [retrieved on Jul. 10, 2015] Retrieved from the internet <URL:https://en.wikipedia.org/wiki/David_Cope>.

* cited by examiner

PROCEDURALLY GENERATING BACKGROUND MUSIC FOR SPONSORED AUDIO

BACKGROUND

1. Field of Art

The present invention generally relates to delivering audio content and, more specifically, to generating audio content having similar audio and musicological features to other audio content delivered to a user.

2. Background of the Invention

A content server may earn revenue by including sponsored audio among user-desired content and receiving payment from sponsors in return. For example, a content server may insert sponsored audio between songs in an audio content stream provided to a user. However, inserting sponsored audio into content may disrupt the user experience, causing some users to pay less attention to the provided content or to terminate the application delivering the content. When users terminate an application delivering content from the content server, the content server cannot serve sponsored audio and loses revenue. Accordingly, disruptions to the user experience reduce content server revenue.

The disruption to the user experience from sponsored content is exacerbated when the sponsored audio is dissimilar from other content provided to a user. In traditional media, producers may manually select and sequence sponsored audio to improve coherency (e.g., during commercial breaks). However, in a personalized media distribution environment, manually sequencing sponsored audio may be infeasible because of the sheer number of personalized media channels. As a result, content servers providing a variety of content may present sponsored audio that is mismatched with surrounding content, which disrupts the user experience and consequently reduces content server revenue.

SUMMARY

In one embodiment, a computer-implemented method for selecting audio similar to music provided to a client device comprises the following steps. Sponsored audio information received from a third-party sponsor is accessed. Reference music features describing characteristics of reference songs are obtained. Music generation parameters are determined based on the sponsored audio information and the reference music features. Background music is generated by using the determined music generation parameters as input to a procedural music algorithm. Sponsored audio is generated based on the generated background music. The sponsored audio is provided to a client device for presentation to a user.

In one embodiment, a system for selecting audio similar to music provided to a client device comprises a processor and a computer-readable storage medium comprising instructions executable by the processor. The instructions comprise instructions for performing the following steps. Sponsored audio information received from a third-party sponsor is accessed. Reference music features describing characteristics of reference songs are obtained. Music generation parameters are determined based on the sponsored audio information and the reference music features. Background music is generated by using the determined music generation parameters as input to a procedural music algorithm. Sponsored audio is generated based on the generated background music. The sponsored audio is provided to a client device for presentation to a user.

In one embodiment, a computer-readable storage medium comprises computer program instructions for selecting sponsored audio similar to music provided to a client device. The instructions are executable by a processor. The instructions comprise instructions for performing the following steps. Sponsored audio information received from a third-party sponsor is accessed. Reference music features describing characteristics of reference songs are obtained. Music generation parameters are determined based on the sponsored audio information and the reference music features. Background music is generated by using the determined music generation parameters as input to a procedural music algorithm. Sponsored audio is generated based on the generated background music. The sponsored audio is provided to a client device for presentation to a user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
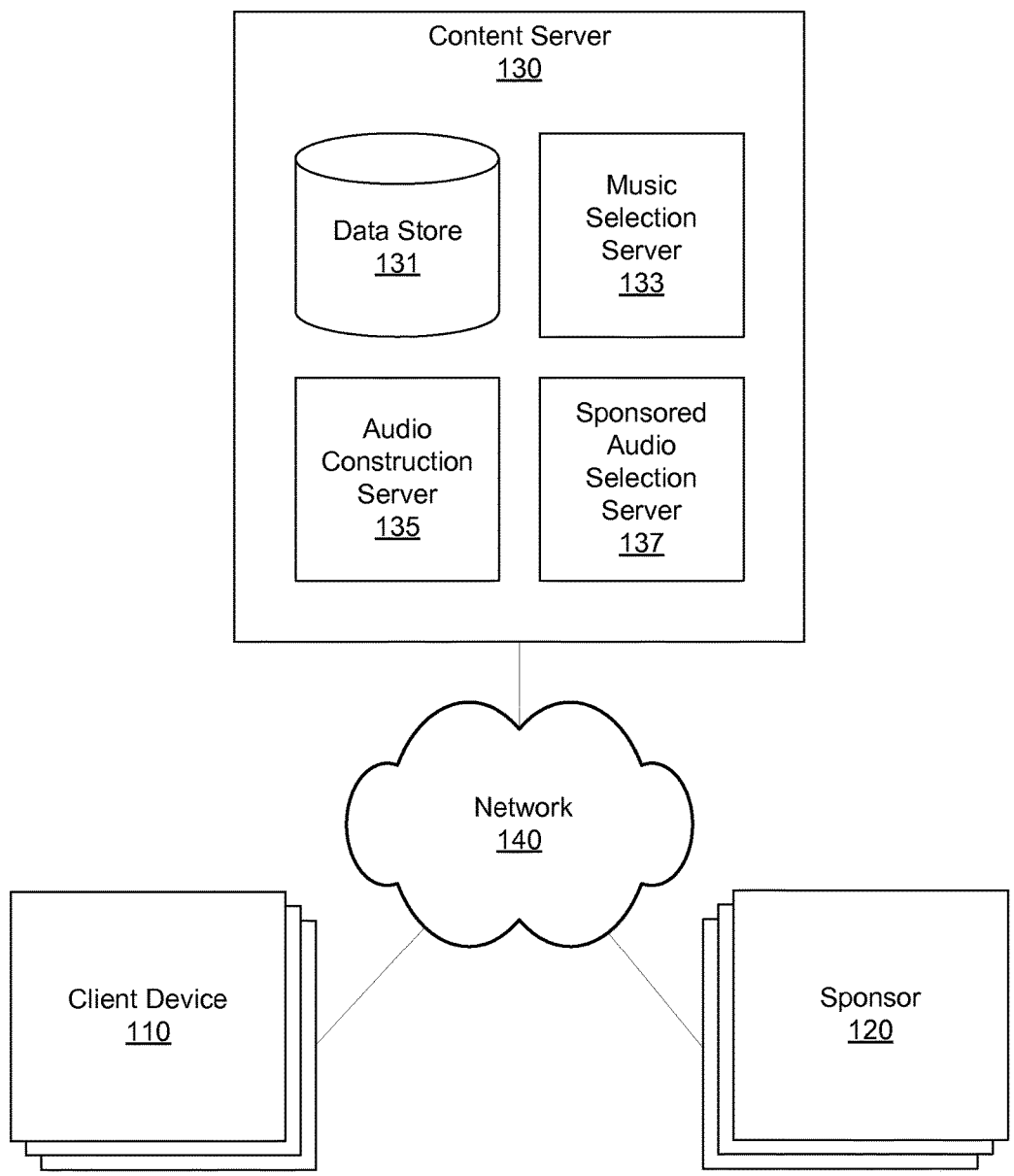
FIG. 1 illustrates a computing environment for generating sponsored audio, according to an embodiment.

FIG. 1 illustrates a computing environment for generating personalized sponsored audio, according to an embodiment. The environment includes entities such as client devices 110, sponsors 120, and a content server 130.

The client devices 110 are computing devices such as smartphones with an operating system such as ANDROID or APPLE IOS, tablet computers, laptop computers, desktop computers, electronic stereos in automobiles or other vehicles, or any other type of network-enabled device that plays digital content. Typical client devices 110 include hardware and software to output sound (e.g., speakers and microphone), connect to the network 140 (e.g., via Wi-Fi and/or 3G or other wireless telecommunication standards), and receive user inputs to select audio content.

The client devices 110 may have an application that allows interaction with the content server 130. For example, the application could be a browser that allows a user of the client device 110 to obtain content by browsing a web application provided by the content server 130. As another example, the application could be an application native to the operating system of the client device 110 and designed to enable interactions with the content server 130 and its content. In addition to allowing a user to obtain content from the content server 130, the application may also provide the content server 130 with data about the status and use of the client device 110, such as its network identifier and geographic location. In some embodiments, the user of the application may elect to disable this feature.

The application on a particular client device 110 may be associated with a user of the client device 110 (e.g., via a one-time registration, a username and password, two-factor authentication, or other credentials). When the application is associated with a user, the application can store or otherwise gain access to user information such as user profile data (e.g., interests, demographics, content preferences, location). User information may be expressly provided through the application when a user configures a user profile on the content server 130. The client device 110 is described in further detail with respect to FIG. 2.

In general, the content server 130 provides audio content, such as songs, pieces of music, or audio recordings. Audio content (also referred to as "audio") refers to any media with an audio component, including stand-alone audio as well as videos, images, animations, and text associated with an audio component. Audio content may be represented in digital form (e.g., intensity values for a series of samples), encrypted or compressed digital form, analog form, or any other suitable format. Audio content includes music and songs, which refer to stand-alone audio as well as other media having a musical audio component (e.g., music videos). In one embodiment, the content server 130 provides streamed audio content, but the content server 130 may alternatively or additionally provide downloadable files comprising audio content. In one particular embodiment referred to throughout the specification, the content server 130 provides streamed audio. Subsequent references to "playing," "listening," or other audio-related terminology could equally apply to (for example) a client device 110 presenting other media (e.g., a video, a slideshow with audio) from the content server 130 for a user to experience.

The content server 130 provides sponsored audio, which may be interspersed between, or incorporated into, non-sponsored audio content. Sponsored audio is a marketing communication or advertisement delivered on behalf of a sponsor 120. For example, the content server 130 provides a stream of audio content (e.g., an audio playlist) including sponsored audio interspersed between songs. The content server 130 generates sponsored audio by combining an audio voiceover concurrently with background music. An audio voiceover includes spoken or sung language and may include other noises such as sound effects. Background music is typically instrumental music, but may include vocal music (e.g., during quiet portions of the audio voiceover).

Sponsors 120 are entities that provide the content server 130 with sponsored audio information, which the content server 130 uses to present sponsored audio through client devices 110. A sponsor 120 refers an entity that requests presentation of sponsored audio as well as to the systems (e.g., computers) the entity uses to communicate with the content server 130. Sponsors 120 send the content server 130 sponsored audio information, which includes content for presentation as sponsored audio. The sponsored audio information may include an audio voiceover or sponsored text, which the content server 130 converts to an audio voiceover using a text-to-speech (TTS) algorithm. Besides content of the sponsored audio, the sponsored audio information may include sponsor preferences including targeting criteria (e.g., preferred demographics, locations, music preferences), campaign parameters (e.g., budget, bid price), audio settings, or a combination thereof. The audio settings may express constraints on background music to be paired with the audio voiceover, vocal parameters for a TTS algorithm (e.g., voice type, accent, gender, pitch, or pace), or both.

To generate sponsored audio, the content server 130 first identifies reference songs relevant to a context in which the sponsored audio will be presented. The content server 130 generates background music similar to these reference items by identifying music features of the reference songs and mapping the identified music features to music generation parameters. The music features include musicological features corresponding to descriptive characteristics of music as well as acoustic features that quantitatively characterize music. The content server 130 generates the background music using a procedural algorithm according the music generation parameters. The procedural algorithm produces music automatically without human intervention according to rules that are configured by the music generation parameters. The procedural algorithm may be partially dependent on randomness so that the procedural algorithm may generate distinct items of background music from the same set of music generation parameters. The content server 130 combines the generated background music with an audio voiceover obtained from sponsored audio information to generate the sponsored audio for presentation to the user. Because the sponsored audio is procedurally generated, the sponsored audio has greater effectiveness because it has not been heard by the user. Even if the user hears the same audio voiceover multiple times, pairing the audio voiceover with different procedurally generated background music reduces the likelihood of the user muting the sponsored audio or terminating an application presenting the sponsored audio. Additionally, use of procedurally generated music that matches a user's preferences or content playlist reduces the likelihood of that the user will decide to request audio content from another provider on the Internet.

Various implementations may use different reference songs, which provide different advantages. For example, the reference songs are songs included in a content playlist, and the sponsored audio is presented as part of the content playlist. In this example, the content server 130 may generate background music without reference to a particular user, but the generated background music still has characteristics similar to songs the user hears before or after the sponsored audio. This example reduces processing time to generate sponsored audio, because the same sponsored audio may be stored and presented to multiple users listening to the same content playlist. As a second example, the reference songs are songs that a user has liked. As a third example, the reference songs are songs that have been presented to a user soon before the sponsored audio. In the second and third examples, the background music may be unique to the user. In the third example, the background music is unique to the context in which the client device 110 presents the sponsored audio. Thus, the background music may be tailored to better fit with the music played before it as well as the musical preferences of the user.

The client devices 110, the sponsors 120, and the content server 130 are connected via a network 140. The network 140 may be any suitable communications network for data transmission. The network 140 uses standard communications technologies and/or protocols and can include the Internet. In another embodiment, the network 140 includes custom and/or dedicated data communications technologies.

Content Server

The components of the content server 130 include a data store 131, a music selection server 133, an audio construction server 135, and a sponsored audio selection server 137. The components of the content server 130 are not necessarily implemented on any one device or group of co-located devices. For example, the content server 130 may include a content distribution network that supplies music from geographically data stores 131. Some components of the content server 130 may be controlled by a third-party entity. For example, the function of the sponsored audio selection server 137 is provided in whole or in part by an advertisement exchange. Any of the functions performed by the audio construction server 135 may be performed by other portions of the content server 130 working alone or in combination with the audio construction server 135.

The data store 131 stores music content, music metadata, ad content, and sponsored audio information. Music content (also referred to as "music" or a "song") is audio representing sounds arranged to evoke beauty or emotion, typically through rhythm, melody, or harmony. Music metadata includes bibliographic information (e.g., artist, composer, album title, track name, track number, release date, record label, genre) and associated musicological features that characterize the associated audio content. A musicological feature is a descriptive label or characteristic of a song. For example, musicological features of a song may indicate the gender of the singer, the type of background vocals, the tempo, the quality of the tones (e.g., pure or distorted), whether the melody dominates the composition, or related musical influences. A given song, or other unit of audio content may have many (e.g., 100-500) musicological features. In one embodiment, the association between music and musicological features is provided by the MUSIC GENOME PROJECT database created by PANDORA MEDIA, INC. of Oakland, Calif. In addition to music content and associated music metadata, the data store 131 contains sponsored audio information including an audio voiceover or text for conversion to audio voiceover as well as sponsor preferences (e.g., targeting criteria, audio settings, campaign settings).

The music selection server 133 provides music to a requesting client device 110. If the content server 130 provides streaming audio, for example, then the music selection server 133 selects audio content and streams the selected audio to the client device 110 over time. The music selection server 133 may select music for a user based at least in part on user information (e.g., user preferences), user requests, user feedback, or a combination thereof.

In one embodiment, the music selection server 133 generates content playlists and selects audio content from the content playlists based on a playlist seed received from a user. A playlist seed describes one or more characteristic of the content playlist that the user would like formed. Playlist seeds may specify bibliographic information of audio content (e.g., track title, band name, album title, release year) or any term to describe music (e.g., musical genre, historical era, a musicological feature). The music selection server 133 extracts musicological features from the playlist seed using a mapping between audio content associated with the playlist seed and corresponding musicological features in the data store 131. If the playlist seed does not describe a single item of audio content, the music selection server 133 retrieves one or more items audio content associated with the playlist seed. For example, the music selection server 133 retrieves one or more representative songs (e.g., of a genre, of a band). The music selection server 133 uses the extracted musicological features to dynamically generate a content playlist of audio content having musicological features similar to the extracted musicological features. For example, given a playlist seed of a band X, the music selection server 133 locates a song Y by band X and identifies musicological features that characterize the song Y. The music selection server 133 may track user feedback given to audio content and customize a content playlist according to a user's inferred preferences.

The audio construction server 135 receives sponsored audio information and generates sponsored audio. The audio construction server 135 generates the background music procedurally to match reference songs relevant to the context in which the client device 110 presents the sponsored audio. The audio construction server 135 combines the background music with an audio voiceover (included in the sponsored audio information or generated from text in the sponsored audio) to generate the sponsored audio. The audio construction server 135 is described in further detail with respect to FIGS. 3 and 4.

The sponsored audio selection server 137 receives multiple items of sponsored audio, including sponsored audio generated by the audio construction server. From the multiple items of sponsored audio, the sponsored audio selection server 137 selects one item of sponsored audio for presentation to a user of a client device 110 receiving audio content. The application on the client device 110 may request sponsored audio to present between items of audio content. For example, the application queries the sponsored audio selection server 137, which selects sponsored audio and provides it to the client device 110. As another example, the sponsored audio selection server 137 pre-selects sponsored audio to accompany audio content selected for the client device 110. The sponsored audio selection server 137 may select the sponsored audio from among items of sponsored audio that do not include generated background music. The sponsored audio selection server 137 may select the sponsored audio based on a various factors, such as user characteristics, preferences, musical context, or bid amounts associated with the sponsored audio. The sponsored audio selection server 137 may also select non-audio sponsored content to deliver to the client device 110 (e.g., interactive visual content, animations, images).

Client Device

Figure 2:
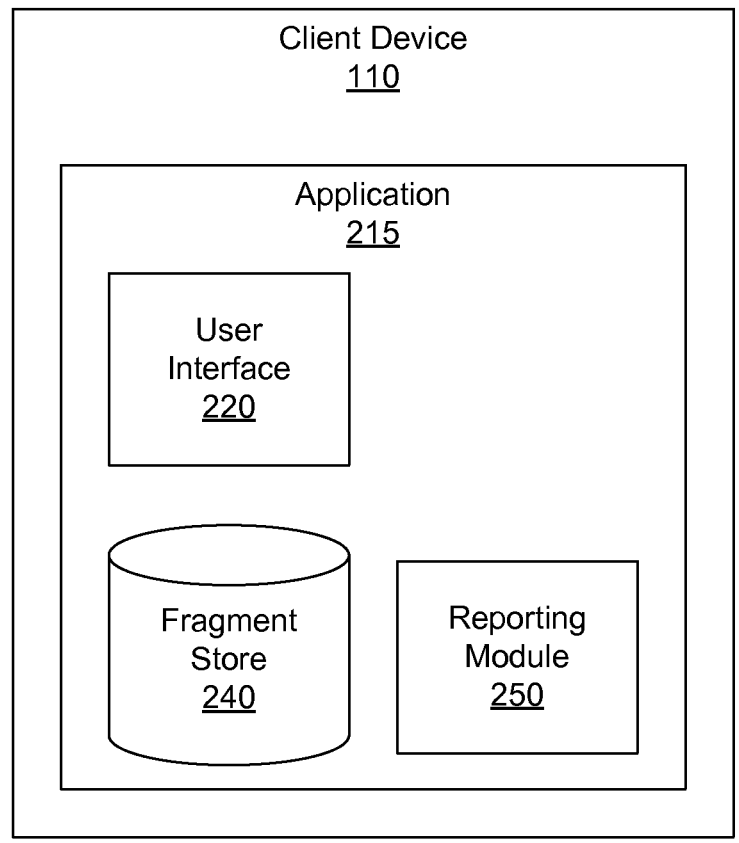
FIG. 2 is a high-level block diagram illustrating a detailed view of a client device, according to an embodiment.

FIG. 2 is a high-level block diagram illustrating a detailed view of a client device 110, according to an embodiment. The client 110 includes an application 215, which includes a user interface 220, a fragment store 240, and a reporting module 250.

The user interface 220 facilitates interaction between the user and the content server 130. For example, the application 215 provides a graphical user interface for interacting with an audio stream. An example user interface 220 displays bibliographic information about a currently playing or previously played song and may also include a video, animation, or image ad from the sponsored audio selection server 137. The user interface 220 may also provide playback controls (e.g., pause, skip, play) and feedback controls (e.g., like, dislike, favorite, rate, share, bookmark) to indicate the user's positive, negative, or indifferent reaction to a song. In one embodiment, a user may request a playlist through the user interface 220 by providing a playlist seed used by the music selection server 133 to generate a content playlist.

The fragment store 240 stores audio content received from the audio server 130 to be played by the content device 110. In one embodiment, the content server 130 provides content fragments comprising a number of audio content items (e.g., four songs) and/or sponsored audio. The music selection server 133 may select related audio content for use in a content fragment. For example, a content fragment contains songs and sponsored audio having similar musicological features, so the user experiences smoother transitions between songs. Content fragments may include slots for sponsored audio (e.g., zero to two slots). A slot for an advertisement provides instructions for retrieving sponsored audio from the content server 130 for playback through the client device 110. Alternatively or additionally, the stored content fragment includes the sponsored audio itself, which is selected for presentation along with the other songs in the fragment.

The reporting module 250 transmits usage data to the content server 130. Usage data includes feedback received through the user interface 220. Feedback includes explicit feedback (from a feedback control in the user interface 220) and implicit feedback (e.g., skipping a song, pausing a song, sharing a song). The reporting module 250 may also query an operating system of the client device 110 to collect feedback information indicating whether a user is listening to presented content. For example, the reporting module 250 identifies changes in audio volume or changes in playback device connectivity (e.g., physical disconnection, selection of a different audio or visual output device). The reporting module 250 also records and reports when a user exits or otherwise terminates the application 215. Since some playback controls within the application 215 may be disabled during sponsored audio, user commands to the operating system of the client device 110 improve feedback information.

The reporting module 250 transmits feedback reports to the content server 130. Feedback reports identify the feedback action and the triggering audio content. For example, when a user terminates the application 215 during sponsored audio, the reporting module 250 reports the sponsored audio as the audio content triggering the negative user disengagement from the application. The content server 130 may select ads and music based at least in part on the feedback reports and other usage data. For example, the content server 130 treats a termination of the application 215 as stronger negative feedback for identifying a user's musical preferences.

Audio Construction Server

Figure 3:
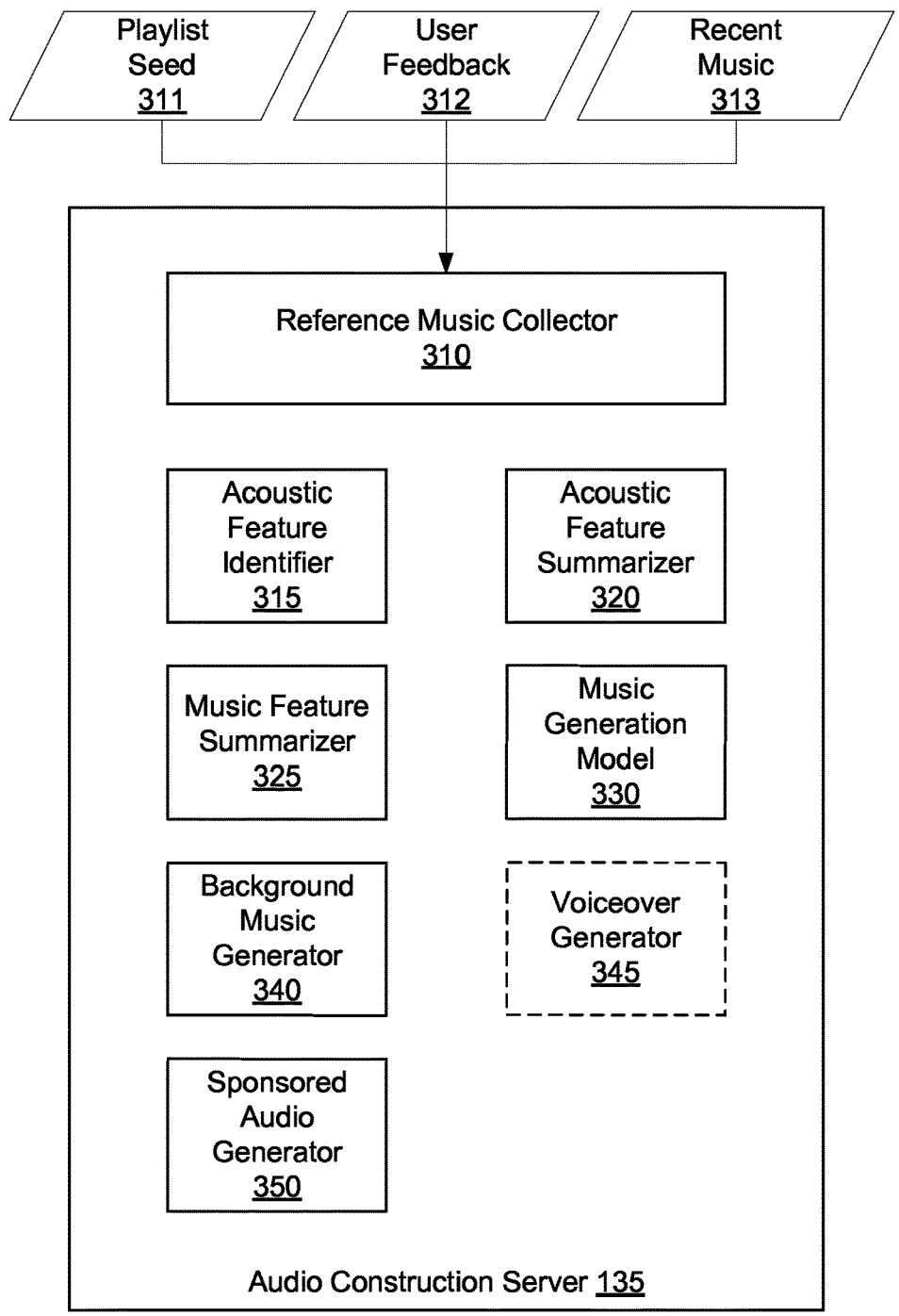
FIG. 3 is a high-level block diagram illustrating a detailed view of an audio construction server, according to an embodiment.

FIG. 3 is a high-level block diagram illustrating a detailed view of an audio construction server 135, according to an embodiment. The audio construction server 135 includes a reference music collector 310, an acoustic feature identifier 315, an acoustic feature summarizer 320, a music feature summarizer 325, a music generation model 330, a background music generator 340, a voiceover generator 345, and a sponsored audio generator 350. Some embodiments of the audio construction server 135 have different modules than those described below or may distribute functions in a different manner than that described below.

The reference music collector 310 obtains reference songs used as a basis for generating background music. The reference music collector 310 obtains reference songs from a playlist seed 311, user feedback 312, recent music 313, or a combination thereof.

To generate background music for presentation as part of a particular content playlist, the reference music collector 310 obtains the playlist seed 311 of that content playlist. As described above with respect to the music selection server 133, a playlist seed 311 includes a characteristic (e.g., bibliographic information, time period, genre) of songs that a user would like included in the content playlist. The reference music collector 310 identifies songs that have the specified characteristic. If the playlist seed 311 includes multiple characteristics, the reference music collector 310 identifies songs that have all (or at least a threshold number or threshold proportion) of the specified characteristics. The reference music collector 310 need not obtain every song having the playlist seed, such as a genre playlist seed. Instead, the reference music collector 310 may sample or otherwise collect a number of reference songs not exceeding a threshold number of songs.

To generate background music for presentation to a particular user, the reference music collector 310 obtains user feedback 312 from that particular user. The music collector 310 outputs the songs that received user feedback 312 as the reference music. The user feedback 312 may include explicit feedback (from feedback buttons on the user interface 220), implicit feedback (e.g., shares, skips, terminating the application 215, reducing or muting audio on the client device 110), or both. The reference music collector 310 may output only songs that have received positive feedback, or the reference music collector 310 may include songs receiving negative feedback. The audio construction server 135 uses such negative feedback to reduce the prevalence of music features that the user dislikes. In some embodiments, the content server 130 may store overall preferences, which indicate a user's general like or dislike of given music features. A user's overall preferences are updated in response to receiving feedback from the user.

To generate background for presentation to a user based on recent songs presented to the user, the reference music collector 310 obtains recent music 313, which includes content provided to a client device 110 associated with a user. The music collector 310 outputs the recent music 313 as the reference music. The music collector 310 may obtain recent music 313 based on a report from the music selection server 133 of songs sent to the client device 110 or based on reports from the reporting module 250 indicating whether the sent songs were actually played. Generally, recent music 313 includes songs played in temporal proximity to a sponsored content slot during which sponsored content will be played. Temporal proximity refers to music content presented within a threshold number of songs (e.g., one, three, five, or ten songs) from the sponsored content slot. Using a song played immediately before sponsored audio as a reference song beneficially improves the musical similarity of generated background music to the immediately previous song. However, in some embodiments, the reference songs does not include the song played immediately before the sponsored audio because including the previous song provides a limited time (e.g., the length of that previous song) for generating and sending the sponsored audio to be presented immediately after the previous song.

The acoustic feature identifier 315 obtains the reference songs and determines acoustic features quantitatively describing the reference songs. The acoustic feature identifier 315 analyzes reference songs to extract acoustic characteristics of the reference songs. The acoustic feature identifier 315 may apply one or more fast Fourier transforms (FFTs), discrete cosine transforms (DCTs), or other transforms to identify periodic functions (e.g., sine waves at a given frequency) in a reference song or a portion thereof. For example, the spectrums resulting from an FFT are acoustic features that describe the relative strength of tones or pitches within a reference song. As another example, the acoustic feature identifier 315 applies an autocorrelation function to the series of samples from a reference song. The resulting coefficients may indicate tempo or meter of the reference song, with the stronger autocorrelation coefficients corresponding to the stronger periods of temporal repetition. The acoustic feature identifier 315 may apply a series of transforms to determine audio features. As a third example, the acoustic feature identifier 315 determines the mel-frequency cepstrum coefficients (MFCCs) of a reference song by applying a DCT to the reference song's mel-scaled log power frequency spectrum (determined from the Fourier transform). The MFCCs provide a profile of timbres within the reference song.

Taking the acoustic features as input, the acoustic feature summarizer 320 generates acoustic feature coordinates representing the acoustic features. An acoustic feature coordinate may have entries indicating values for particular acoustic features, or the acoustic feature coordinate may be a vector or other representation of audio content's acoustic features. In some embodiments, the acoustic feature summarizer 320 applies a dimensionality reduction to acoustic feature coordinates (e.g., PCA) by combining correlated acoustic features into one or more condensed acoustic features. In such an embodiment, the acoustic feature summarizer 320 outputs a dimensionally reduced acoustic feature coordinate in place of the initial acoustic feature coordinate, beneficially reducing computational time for the music generation model 330.

The music feature summarizer 325 receives reference songs and generates a reference coordinate summarizing music features of these reference songs. The music feature summarizer 325 obtains musicological features associated with the reference songs. For example, the music feature summarizer 325 retrieves the musicological features associated with the audio content from the data store 131 (e.g., the MUSIC GENOME PROJECT database). The music feature summarizer 325 generates a coordinate, vector, or other symbolic representation of the obtained musicological features for a reference song. For example, the coordinate includes binary entries each indicating whether the audio content is associated with a particular musicological feature. The music feature summarizer 325 may combine the coordinate representing the musicological features of the song with an acoustic feature coordinate to output one coordinate representing both the musicological features and acoustic features.

The music feature summarizer 325 combines coordinates representing the music features of the individual reference songs into a reference coordinate summarizing the music features. For example, the music feature summarizer 325 averages the coordinates to generate the reference coordinate, so an entry of the reference coordinate corresponding to a musicological feature represents that musicological feature's prevalence among the reference songs. In this example, an entry of reference coordinate corresponding to an acoustic feature represents the acoustic feature's average value among the reference songs. Alternatively or additionally, the music feature summarizer 325 combines the coordinates of the reference songs into the reference coordinate using another measure of central tendency.

When combining the coordinates into the reference coordinate, the music feature summarizer 325 may use a weighted average of the coordinates, where the weight of a coordinate depends on the reference song it represents. For a reference song included because it received feedback, the music feature summarizer 325 may assign a weight to the corresponding coordinate according to a type of feedback given to the reference song. For example, positive feedback corresponds to a positive weight, negative feedback corresponds to a negative weight, and feedback associated with strong like or dislike corresponds to a weight having a greater magnitude than feedback associated with mild like or dislike. For a reference song included because it was recently presented by the user's client device 110, the music feature summarizer 325 may assign a weight to the corresponding coordinate according to how recently the song was presented. For example, a weight for a reference song's coordinate decreases as time elapsed (or number of songs played) since presentation of the song increases. The music feature summarizer 325 may weight a coordinate corresponding to a reference song depending on whether the reference song was obtained based on playlist seed 311, user feedback 312, or recent music 313. For example, a coordinate corresponding to a reference song obtained from recent music 313 has a higher weight than a coordinate corresponding to a reference song obtained from a playlist seed 311.

From the reference coordinate representing the reference songs, the music generation model 330 determines music generation parameters used to procedurally generate background music that is similar to the reference songs. The music generation model 330 may further determine some music generation parameters based on constraints specified by a sponsor 120 in sponsorship information. The music generation model 330 determines a music generation parameter indicating the duration of the sponsored audio from the duration of the audio voiceover indicated by the sponsored audio information. Other example music generation parameters include binary parameters (e.g., presence of an instrument in generated music, presence of major tonality, presence of minor tonality) and quantitative parameters (e.g., tempo, horizontal density of tones over time, vertical density of tones at a given time, melodic range, harmonic variety, rhythmic variety, register of initial melody note, average volume, volume variation). Some music generation parameters may be represented with either a binary feature or a numerical feature. For example, rhythmic meter may be represented by binary features (e.g., common time, waltz time) or numerical features (e.g., pulses per measure, pulse groupings per measure).

In general, the music model 330 maps the music features (represented by the reference coordinate) into music generation parameters that will produce generated background music similar to the reference music. The mapping may include some predefined rules that set a music generation parameter to active if the music features meet one or more conditional tests. For example, if the music features include a particular subset of musicological features, the music model 330 sets a music generation parameter corresponding to a particular genre or instrument to active. For example, if the music features include a "country" music feature, the music model 330 sets a music generation parameter corresponding to "acoustic guitar" to active. In this example, the resulting background music from the background music generator 340 would include at least some sounds modeled after an acoustic guitar.

In addition to predefined rules, the music model may include a mapping determined from various machine learning models. The music model 330 may determine a binary music generation parameter according to a machine learning classifier that takes the music features as input. The music model 330 may determine a numerical music generation parameter according to a machine learning regression that takes the music features as input. Since some music generation parameters are correlated, the music model 330 may include a decision tree, which includes predefined rules, machine-learned rules, or both. The numerical and binary coefficients defining any classifier, regression, decision tree, or other mapping rule in the music model 330 are referred to as model parameters or model weights. The music model 330 is described further with respect to FIG. 4.

The background music generator 340 receives music generation parameters and outputs background music generated procedurally according to the music generation parameters 340. The background music generator 340 may include any procedural music generation techniques, including both deterministic and random techniques. For example, the background music generator 340 uses a Markov-based technique to select pitches within a tonality (e.g., major diatonic, minor diatonic, pentatonic) specified by the music generation parameters. Transitions between melodic notes, harmonic chords, melodic durations, harmonic durations, or a combination thereof are associated with transition probabilities which may be included in the music generation parameters. The transition probabilities to determine a next note, chord, or duration depend on the previous note, chord, duration, or a combination thereof. The music generator 340 sequentially selects note pitches, note durations, chords, and chord durations according to the transition probabilities. The music generator 340 may compose tones for one or more voices corresponding to instruments indicated to be active by the music generation parameters. Alternatively or additionally, the music generator 340 uses a neural network, genetic algorithm, or other procedural technique to generate the background music. Based on an amount of repetition desired in the background music (i.e., as indicated by a music generation parameter), the music generator 340 may also compose variations on an initial sequence. For example, the music generator 340 randomly selects a portion of the initial sequence for inclusion in a variation sequence and generates the remaining portions of the variation sequence based on transitions from the portions of the initial sequence included in the variation sequence. The background music generator 340 may apply audio processing effects to improve a match between the background music and the reference songs. For example, the music model 330 determines equalization parameters of the reference songs, and the background music generator 340 applies an audio equalization to the background music according to the equalization parameters. Applying such processing effects improves acoustic match between the generated background music and the reference songs. The background music generator 340 outputs background music having a duration greater than or equal to a duration of the audio voiceover.

In some embodiments, the sponsored audio information includes sponsored text for conversion to an audio voiceover. The voiceover generator 345 generates the audio voiceover based on sponsored audio information using a text-to-speech (TTS) algorithm. The voiceover generator 345 may use various TTS algorithms. The TTS algorithm may be dictionary based or phonetic based. The TTS algorithm may include linguistic analysis to determine pronunciation (e.g., of homonyms) and prosody of phrases, words, syllables, or phonemes. In one embodiment, the voiceover generator 345 generates the audio voiceover based on vocal parameters included in the sponsored audio information. Alternatively or additionally, the content server 130 determines vocal parameters according to vocal characteristics of the reference songs. Vocal parameters may specify a pre-packaged voice (e.g., male or female, a silky voice, a gravelly voice) or may indicate particular variables that control how the TTS algorithm synthesizes the audio voiceover. Example vocal parameters include register, tone, pace, or emotion of the spoken audio produced by the voiceover generator 345. The voiceover generator 345 may combine the audio voiceover with sound effects specified by the sponsored audio. In some embodiments, the sponsored audio information includes an audio voiceover instead of sponsored text, which obviates the voiceover generator 345.

The sponsored audio generator 350 combines the generated background music with the audio voiceover to generate the sponsored audio. If the background music has a duration exceeding a requested duration of the sponsored audio, the sponsored audio generator 350 selects a portion of the background music having a duration equal to the requested duration. The sponsored audio generator 350 may assign different volume mixing coefficients to the audio voiceover and background music to ensure that the audio voiceover is audible and intelligible. The volume mixing coefficients may be constant, or the sponsored audio generator 350 may vary the volume mixing coefficients through the extent of the sponsored audio. For example, the background music has a lower volume mixing coefficient when the audio voiceover is speaking and a higher volume mixing coefficients when the audio voiceover has a pause exceeding a threshold duration. The sponsored audio generator 350 may apply fade-in effects, fade-out effects, compression, or other audio processing effects to the generated sponsored audio. The content server 130 may send the sponsored audio to the client device 110 for presentation or may store the sponsored audio in the data store 131 for subsequent presentation.

Music Generation Model

Figure 4:
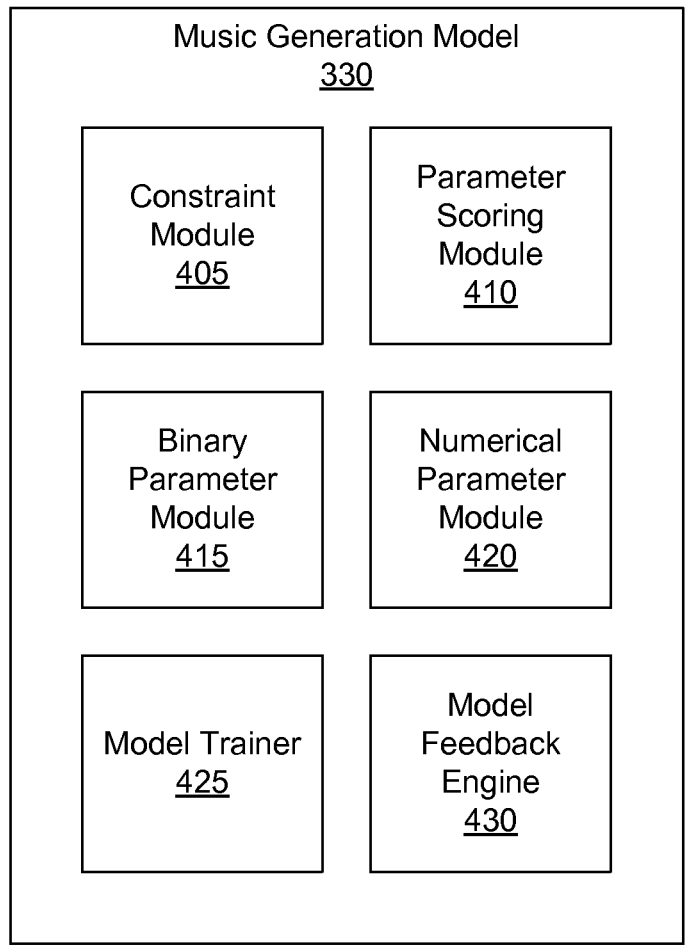
FIG. 4 is a high-level block diagram illustrating a detailed view of a music generation model, according to an embodiment.

FIG. 4 is a high-level block diagram illustrating a detailed view of a music generation model 330, according to an embodiment. The music generation model 330 includes a constraint module 405, a parameter scoring module 410, a binary parameter module 415, a numerical parameter module 420, a model trainer 425, and a model feedback engine 430. Some embodiments of the music generation model 330 have different modules than those described below or may distribute functions in a different manner than that described below.

The constraint module 405 obtains constraints from sponsored audio information and outputs music generation parameters that comply with the obtained constraints. Constraints include positive constraints that specify music generation features specifically requested by a sponsor. Constraints also include negative constraints that specify restrictions on music generation features. For example, a flannel shirt retailer includes a negative constraint forbidding music generation parameters associated with dubstep. The constraint module 405 may verify that music generation parameters selected by the binary parameter module 415 and the numerical parameter module 420 conform to the negative constraints.

The parameter scoring module 410 takes as input a reference coordinate and outputs a score for a music generation parameter. The parameter scoring module 410 includes one or more machine learning models, classifiers, or regressions to determine a score for a music generation parameter based on the reference coordinate. The parameter scoring module 410 may include a set of weights that maps a reference coordinate to a score for a given music generation parameter. For example, the score is determined based on a weighted linear combination of the entries of the reference coordinate weighted according to the set of weights.

The binary parameter module 415 takes as input a score for a binary music generation parameter and outputs a value for the binary music generation parameter. The binary parameter module 415 may determine the value of the binary music generation parameter based on a comparison to a threshold. In some embodiments, the music model 330 groups binary music generation parameters into categories. The binary parameter module 410 may eliminate music generation parameters within a category having a score less than a threshold score (or ranking within the category less than a threshold ranking) and randomly select one or more from the remaining music generation parameters within the category. The binary parameter module 415 sets the selected music generation parameters to active and sets the non-selected music generation parameters to inactive. When employing random selection, a music generation feature's probability of selection may be proportional to the score determined for the music generation feature.

The numerical parameter module 420 obtains a score for a music generation parameter from the parameter scoring module 410 and outputs a value for a music generation parameter. In some instances, the weights of the parameter scoring module 410 are configured so that the score for the music generation parameter equals the value of the music generation parameter. In other embodiments, the numerical parameter module 420 applies a transformation to the score to determine the value of the music generation parameter. The numerical parameter module 420 may also adjust a music generation parameter based on a constraint included in the sponsored content information. For example, the numerical parameter module 420 adjusts a music generation parameter to be within a range specified by the constraint.

The model trainer 425 determines music model parameters according to training data. The music model parameters include weights of any classifier, regression, or other machine learning model used by the parameter scoring module 410. The music model parameters also include any threshold rankings and scores used in the binary parameter module 415 as well as other parameters used by the numerical parameter module 420. To determine these music model parameters, the model trainer 425 obtains training music, which may be any music that could be used as reference music. Generally, the model trainer 425 obtains a broad sampling of songs from different artists and genres. In some embodiments, the music model may be tailored to a particular genre of music. In this case, the model trainer 425 obtains songs from different artists within the genre.

The model trainer 425 determines the music model parameters to minimize some measure of difference between training background music generated by the background music generator 340 and the input training music. For example, the model trainer 425 iteratively determines music generation parameters for the training music using initial music model parameters, generates training background music according to the determined music generation parameters, compares the training background music to the input training music, and adjusts the initial music model parameters to reduce a measure of difference between the input training music and the output training background music. Because the output training background music is expected to differ from the input training music, the model trainer 425 compares the two at a higher level rather than comparing them on a note-by-note basis. For example, the model trainer 425 determines music features of the output training background music and compares these to music features of the input training music to determine the measure of difference. Example measures of difference include a distance (e.g., Euclidean, Manhattan) between coordinates and the complement of cosine similarity between the coordinates. Depending on the model used, the model trainer 425 may modify the music model parameters according to any statistical, optimization, or machine learning algorithm such as gradient tree boosting, regression, logistic regression, or neural network training.

The model feedback engine 430 updates music model parameters according to feedback data received from client devices 110. Users are more likely to remain engaged with sponsored audio that matches their musical tastes, other songs in the audio playlist, and the songs preceding the sponsored audio. Thus, feedback from the feedback module 430 indicates in part whether the music generation model outputs music generation parameters that result in musically similar background music. The model feedback engine 430 uses feedback on sponsored audio as an objective function to optimize by varying the music model parameters. In other words, the model feedback engine 430 adjusts the music model parameters to maximize positive feedback and minimize negative feedback. The model feedback engine 430 may use batch learning, online learning, or any other supervised machine learning technique.

Providing Sponsored Audio

Figure 5:
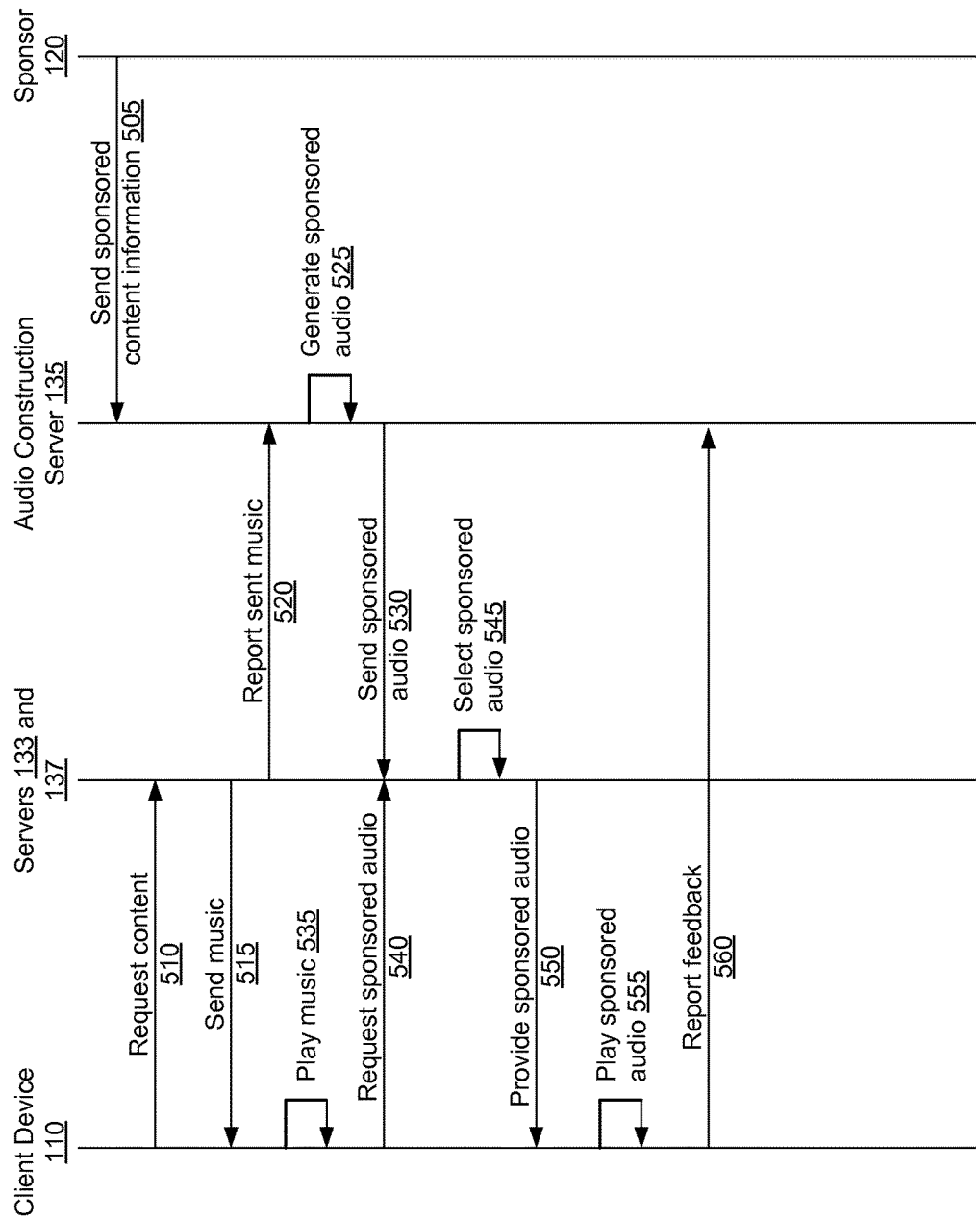
FIG. 5 is a sequence diagram illustrating interactions between the client device, content server, and third-party sponsor, according to an embodiment.

FIG. 5 is a sequence diagram illustrating interactions between the client device 110, sponsor 120, and content server 130, according to an embodiment. A sponsor 120 sends 505 sponsored content information, which includes either an audio voiceover or sponsored text for conversion to audio voiceover using a TTS algorithm.

The client device 110 requests 510 content from the music selection server 133. For example, the client device 110 requests 510 to initiate a streaming session in response to a user input or in response to having less than a threshold amount of audio content stored in the fragment store 240. The music selection server 133 selects music and sends 515 the selected music, which the client device 110 plays 535. Meanwhile, the music selection server 133 reports 520 the sent music to the audio construction server 135.

In response to receiving the report describing the sent music, the audio construction server 135 generates 525 sponsored audio including background music generated based on the sent music. In a first approach, the reported music includes one or more preceding songs used as reference songs for determining music generation parameters used by the background music generator 340. Because the background music is generated on-demand in this approach, the audio construction server 135 has a limited time to generate the sponsored audio. In a second approach, the audio construction server 135 pre-generates background music using a particular song as a reference song. In response to determining that the client device 110 is playing 535 the particular song, the ad construction server 135 generates sponsored audio including the background music generated with the particular song as a reference song. This second approach uses fewer resources than the first approach because the background music may be re-used for multiple users and is generated before the request for the sponsored audio. However, because the number of potential song permutations is very large, the second approach may use only a small number of reference songs (e.g., one or two) to avoid using excessive memory for storage.

Rather than generating background music to match reference songs recently provided to the client device 110, the audio construction server 135 may pre-generate background music to match an audio playlist or to match a user's preferences. In this case, the reference songs depend on the playlist seed 311 or user feedback 312 rather than recent music 313 reported 520 by the music selection server 133 or application 215. The audio construction server 135 may also generate 525 the sponsored audio including the background music before the client device 110 requests 510 content from the content server 130. Because the sponsored audio is generated 525 before a client device 110 requests 540 the sponsored audio, the ad selection server 137 may respond to the request more quickly without waiting for generation of the sponsored audio. Additionally, a sponsored audio may be used multiple times, particularly if the sponsored audio is generated 525 for an audio playlist without reference to a particular user.

The generated sponsored audio is sent 530 to the sponsored audio selection server 137. The client device 110 requests 540 sponsored audio from the sponsored audio selection server 137 for playback in an upcoming slot for sponsored audio. Alternatively, the music selection server 133 instructs the sponsored audio selection server 137 to select and send the sponsored audio. The sponsored audio selection server 137 selects 545 the sponsored audio based on the user's characteristics, music in the user's playlist, targeting criteria in the sponsored content information, or other criteria. The content server 130 provides 550 the sponsored audio, which the client device 110 plays 555 during the slot for the sponsored audio. The client device 110 reports 560 feedback data on the sponsored audio to the audio construction server 135 (if any is received from the user).

Presenting Sponsored Audio Including Procedurally Generated Background Music

Figure 6:
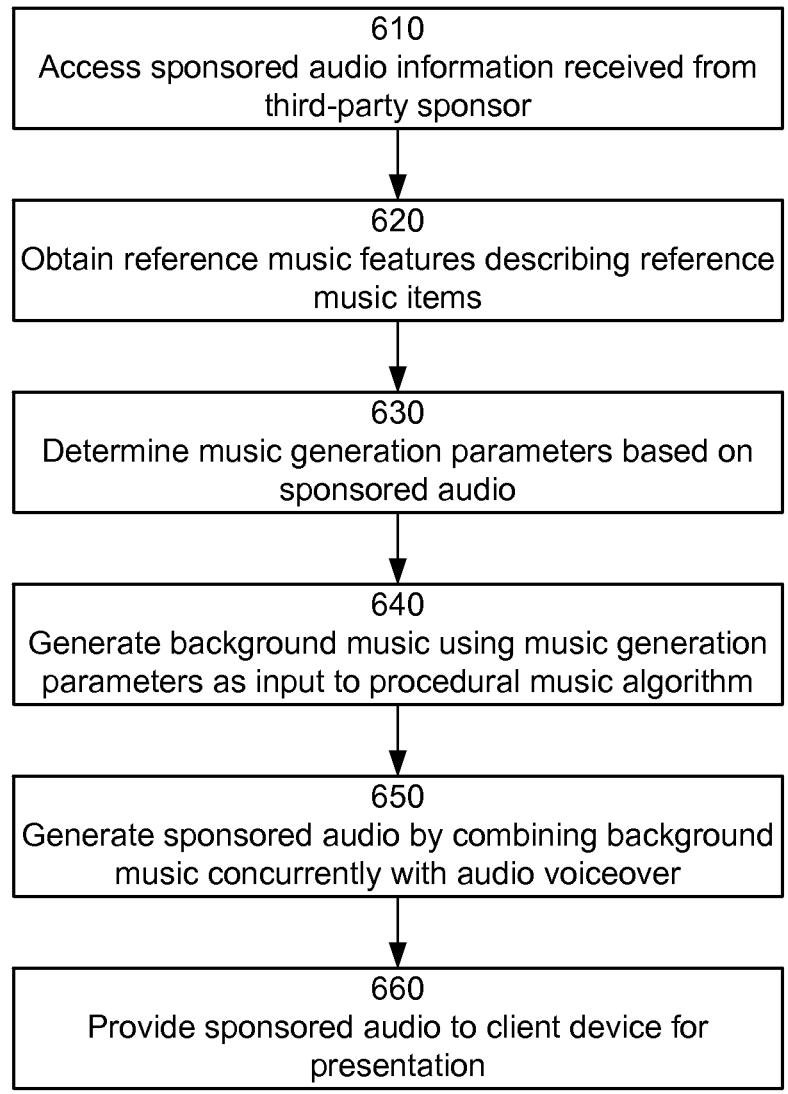
FIG. 6 is a flowchart illustrating an example process generating audio content to provide to a client device, according to an embodiment.

FIG. 6 is a flowchart illustrating an example process for generating audio content to provide to a client device, according to an embodiment. Other entities may perform some or all of the steps of the process in other embodiments. Likewise, embodiments may include different and/or additional steps, or perform the steps in different orders. Although described with respect to serving sponsored audio in a stream of songs, the process described herein may be used to serve sponsored audio before, during, or after other audio content, whether streamed, downloaded, or otherwise provided to the client device 110.

The content server 130 accesses 610 sponsored audio information received from a third-party sponsor. The sponsored audio information includes content of an audio voiceover, which may include a file containing the audio voiceover or sponsored text for conversion to the audio voiceover.

The content server 130 obtains 620 reference music features including musicological features describing musicological characteristics of reference songs, acoustic features describing quantitative characteristics of reference songs, or both. Example reference songs include feedback songs for which the user has provided feedback, playlist songs having a seed characteristic of a content playlist, or a song previously presented by the client device 110 in temporal proximity to the sponsored audio.

The content server 130 determines 630 music generation parameters based on the sponsored audio information and based on a music model mapping the reference music features to music generation parameters. A music generation parameter may be determined based on a music generation constraint, a selection from a category of binary music generation parameters, or a combination of the reference music features according to weights determined by machine learning, for example.

The content server 130 generates 640 background music by using the determined music generation parameters as input to a procedural music algorithm. For example, the procedural music algorithm is a Markov-based algorithm using timbres matching instruments indicated by the binary music generation parameters.

The content server 130 generates 650 sponsored audio by combining the generated background music concurrently with an audio voiceover obtained from the sponsored audio information. The content server 130 may generate the audio voiceover according to a TTS algorithm.

The content server 130 provides 660 the sponsored audio to a client device 110 for presentation to a user.

Computer

Figure 7:
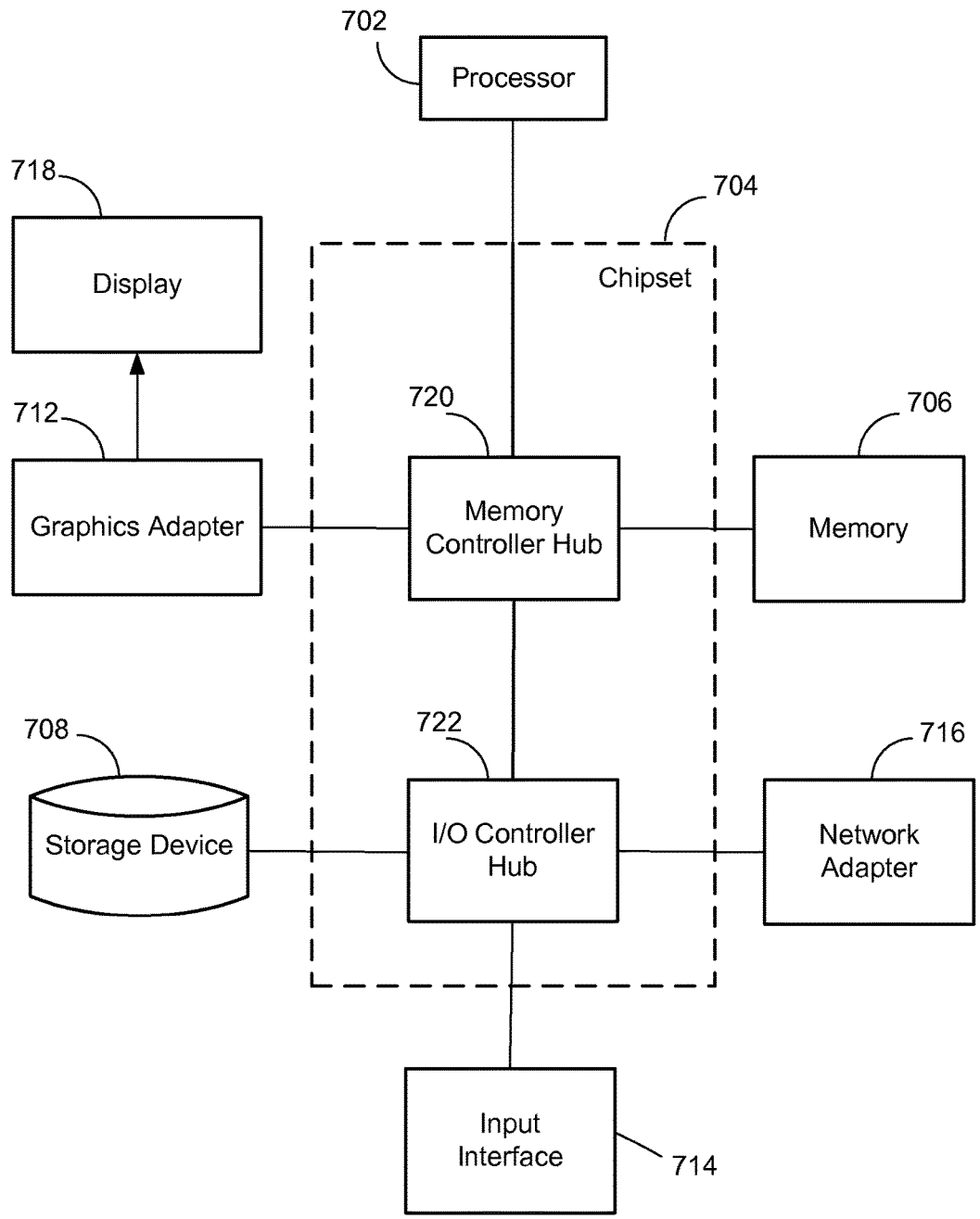
FIG. 7 is a high-level block diagram illustrating an example computer for implementing the entities shown in FIG. 1, according to an embodiment.

FIG. 7 is a high-level block diagram illustrating an example computer 700 for implementing the entities shown in FIG. 1, according to an embodiment. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, an input interface 714, a network adapter 716, and an audio output device 724 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The input interface 714 is a touch-screen interface, a mouse, track ball, or other type of pointing device, a keyboard, or some combination thereof, and is used to input data into the computer 700. In some embodiments, the computer 700 may be configured to receive input (e.g., commands) from the input interface 714 via gestures from the user. The graphics adapter 712 displays images and other information (e.g., the user interface 220) on the display 718. The network adapter 716 couples the computer 700 to one or more computer networks 140. In one embodiment, the display 718 and input interface 714 are combined as a touch-sensitive display (e.g., a touch screen), which detects gestures (e.g., scrolling, tapping, swiping, pinching, stretching). The audio output device 724 produces audible sound waves from electrical signals, such a musical content or sponsored audio. The audio output device includes hardware to convert electrical signals to mechanical vibrations (e.g., a piezoelectric speaker, a dynamic loudspeaker) as well as accompanying electronic circuitry (e.g., an amplifier, a digital-to-analog converter).

The computer 700 is adapted to execute computer program modules for providing functionality described herein. As used herein, the term "module" refers to computer program logic used to provide the specified functionality. Thus, a module can be implemented in hardware, firmware, software, and/or a combination thereof. In one embodiment, program modules (e.g., music generation model 330, background music generator 340) are stored on the storage device 708, loaded into the memory 706, and executed by the processor 702.

The types of computers 700 used to implement the entities of FIG. 1 can vary depending upon the embodiment and the processing power required by the entity. For example, the client device 110 is a computer 700 such as a smart phone or a tablet. As another example, the content server 130 is one or more servers working together to provide the functionality described herein. A computer 700 (e.g., a server) may lack some of the components described above, such as a keyboard, a graphics adapter 712, and a display 718. Alternatively or additionally, the functionality of a computer 700 may be provided by multiple communicatively coupled devices. For example, the client device 110 is a tablet including many of the components of the computer 700 (e.g., the network adapter 716, the chipset 704, the processor 702) communicatively coupled with external audio output device 724 (e.g., a home sound system comprising multiple speakers).

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating sponsored audio content. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for generating audio content, the method comprising:
    accessing sponsored audio information received from a third-party sponsor;
    obtaining reference music features describing characteristics of reference songs;
    determining music generation parameters based on the sponsored audio information and the reference music features;
    producing, by a processor, procedurally-generated background music by inputting the determined music generation parameters to a procedural music algorithm that outputs music generated procedurally according to the music generation parameters;
    generating sponsored audio based on the background music; and
    providing the sponsored audio to a client device for presentation to a user.

2. The method of claim 1, wherein the reference songs comprise feedback songs for which the user has provided feedback, wherein obtaining the reference music features comprises:
    obtaining feedback features describing musicological characteristics of the feedback songs; and
    determining the reference music features based at least in part on a combination of the obtained feedback features weighted according to a type of feedback given each feedback song.

3. The method of claim 1, wherein the reference songs comprise a song presented previously by the client device, wherein obtaining the reference music features comprises:
    obtaining the reference music features from music features of the previously presented song;
    wherein the generated sponsored audio is provided to the client device for presentation in temporal proximity to the previously presented song.

4. The method of claim 1, wherein the sponsored audio information includes a music generation constraint, wherein determining the music generation parameters comprises:
    determining initial music generation parameters by applying a music generation model to the reference music features; and
    determining the music generation parameters by modifying the initial music generation parameters according to the music generation constraint.

5. The method of claim 1, wherein the music generation parameters include a category comprising a plurality of binary music parameters, wherein determining the music generation parameters comprises:
    scoring each binary music parameter using a classifier that takes as input the reference music features; and ranking the plurality of binary music parameters within the category according to the score of each binary music parameter; and selecting a predetermined number of the binary music parameters according to the ranking.

6. The method of claim 1, wherein determining the music generation parameters comprises determining a numerical music generation parameter based at least in part on a combination of the reference music features according to a set of weights included in a machine-learned music generation model.

7. The method of claim 1, wherein obtaining reference music features describing characteristics of reference songs comprises obtaining acoustic features describing numerical characteristics of the reference songs.

8. The method of claim 1, wherein the procedural music algorithm outputs the background music automatically according to rules that are configured by the music generation parameters.

9. The method of claim 1, wherein the procedural music algorithm is at least partially dependent on randomness and outputs different background music from same music generation parameters.

10. A non-transitory computer-readable storage medium comprising computer program instructions executable by a processor, the instructions executable to perform operations comprising:

accessing sponsored audio information received from a third-party sponsor;

obtaining reference music features describing characteristics of reference songs;

determining music generation parameters based on the sponsored audio information the reference music features;

producing procedurally-generated background music by inputting the determined music generation parameters to a procedural music algorithm that outputs music generated procedurally according to the music generation parameters;

generating sponsored audio based on the generated background music; and providing the sponsored audio to a client device for presentation to a user.

11. The storage medium of claim 10, wherein the reference songs comprise feedback songs for which the user has provided feedback, wherein obtaining the reference music features comprises:

obtaining feedback features describing musicological characteristics of the feedback songs; and determining the reference music features based at least in part on a combination of the obtained feedback features weighted according to a type of feedback given each feedback song.

12. The storage medium of claim 10, wherein the reference songs comprise a song presented previously by the client device, wherein obtaining the reference music features comprises:

obtaining the reference music features from music features of the previously presented song;

wherein the generated sponsored audio is provided to the client device for presentation in temporal proximity to the previously presented song.

13. The storage medium of claim 10, wherein the sponsored audio information includes a music generation constraint, wherein determining the music generation parameters comprises:

determining initial music generation parameters by applying a music generation model to the reference music features; and determining the music generation parameters by modifying the initial music generation parameters according to the music generation constraint.

14. The storage medium of claim 10, wherein the music generation parameters include a category comprising a plurality of binary music parameters, wherein determining the music generation parameters comprises:

scoring each binary music parameter using a classifier that takes as input the reference music features; and ranking the plurality of binary music parameters within the category according to the score of each binary music parameter; and selecting a predetermined number of the binary music parameters according to the ranking.

15. A system for generating audio content, comprising:

a processor; and a non-transitory computer-readable storage medium comprising computer program instructions executable by the processor to perform operations comprising:

accessing sponsored audio information received from a third-party sponsor;

obtaining reference music features describing characteristics of reference songs;

determining music generation parameters based on the sponsored audio information the reference music features;

producing procedurally-generated background music by inputting the determined music generation parameters to a procedural music algorithm that outputs music generated procedurally according to the music generation parameters;

generating sponsored audio based on the generated background music; and providing the sponsored audio to a client device for presentation to a user.

16. The system of claim 15, wherein the reference songs comprise feedback songs for which the user has provided feedback, wherein obtaining the reference music features comprises:

obtaining feedback features describing musicological characteristics of the feedback songs; and determining the reference music features based at least in part on a combination of the obtained feedback features weighted according to a type of feedback given each feedback song.

17. The system of claim 15, wherein the reference songs comprise playlist songs having a playlist seed of a content playlist, wherein obtaining the reference music features comprises:

obtaining playlist features describing musicological characteristics of the playlist songs; and determining the reference music features from the playlist music features based on frequency of each music feature among the playlist features;

wherein the generated sponsored audio is provided to the client device for presentation as part of the content playlist having the playlist seed.

18. The system of claim 15, wherein the reference songs comprise a song presented previously by the client device, wherein obtaining the reference music features comprises:

obtaining the reference music features from music features of the previously presented song;

wherein the generated sponsored audio is provided to the client device for presentation in temporal proximity to the previously presented song.

19. The system of claim 15, wherein the sponsored audio information includes a music generation constraint, wherein determining the music generation parameters comprises:
   determining initial music generation parameters by applying a music generation model to the reference music features; and
   determining the music generation parameters by modifying the initial music generation parameters according to the music generation constraint.

20. The system of claim 15, wherein the music generation parameters include a category comprising a plurality of binary music parameters, wherein determining the music generation parameters comprises:
   scoring each binary music parameter using a classifier that takes as input the reference music features; and
   ranking the plurality of binary music parameters within the category according to the score of each binary music parameter; and
   selecting a predetermined number of the binary music parameters according to the ranking.

* * * * *

UNITED STATES PATENT AND TRADEMARK OFFICE
CERTIFICATE OF CORRECTION

PATENT NO. : 10,068,556 B2
APPLICATION NO. : 14/945252
DATED : September 4, 2018
INVENTOR(S) : Fabien Gouyon et al.

Page 1 of 1

It is certified that error appears in the above-identified patent and that said Letters Patent is hereby corrected as shown below:

In the Claims

• In Column no: 18, Line(s) no: 43-44, Claim 2, "feedback given each feedback song" to read as --feedback given to each feedback song--

• In Column no: 18, Line(s) no: 67, Claim 5, "features; and" to read as --features;--

• In Column no: 19, Line(s) no: 34, Claim 10, "audio information the reference" to read as --audio information of the reference--

• In Column no: 19, Line(s) no: 53-54, Claim 11, "feedback given each feedback song" to read as --feedback given to each feedback song--

• In Column no: 20, Line(s) no: 12, Claim 14, "features; and" to read as --features;--

• In Column no: 20, Line(s) no: 29, Claim 15, "audio information the reference" to read as --audio information of the reference--

• In Column no: 20, Line(s) no: 49-50, Claim 16, "feedback given each feedback song" to read as --feedback given to each feedback song--

Signed and Sealed this
Twenty-third Day of April, 2019

Andrei Iancu
*Director of the United States Patent and Trademark Office*